(No Model.) 3 Sheets—Sheet 1.
M. R. HEATHERLY.
REIN HOLDER.
No. 357,991. Patented Feb. 15, 1887.
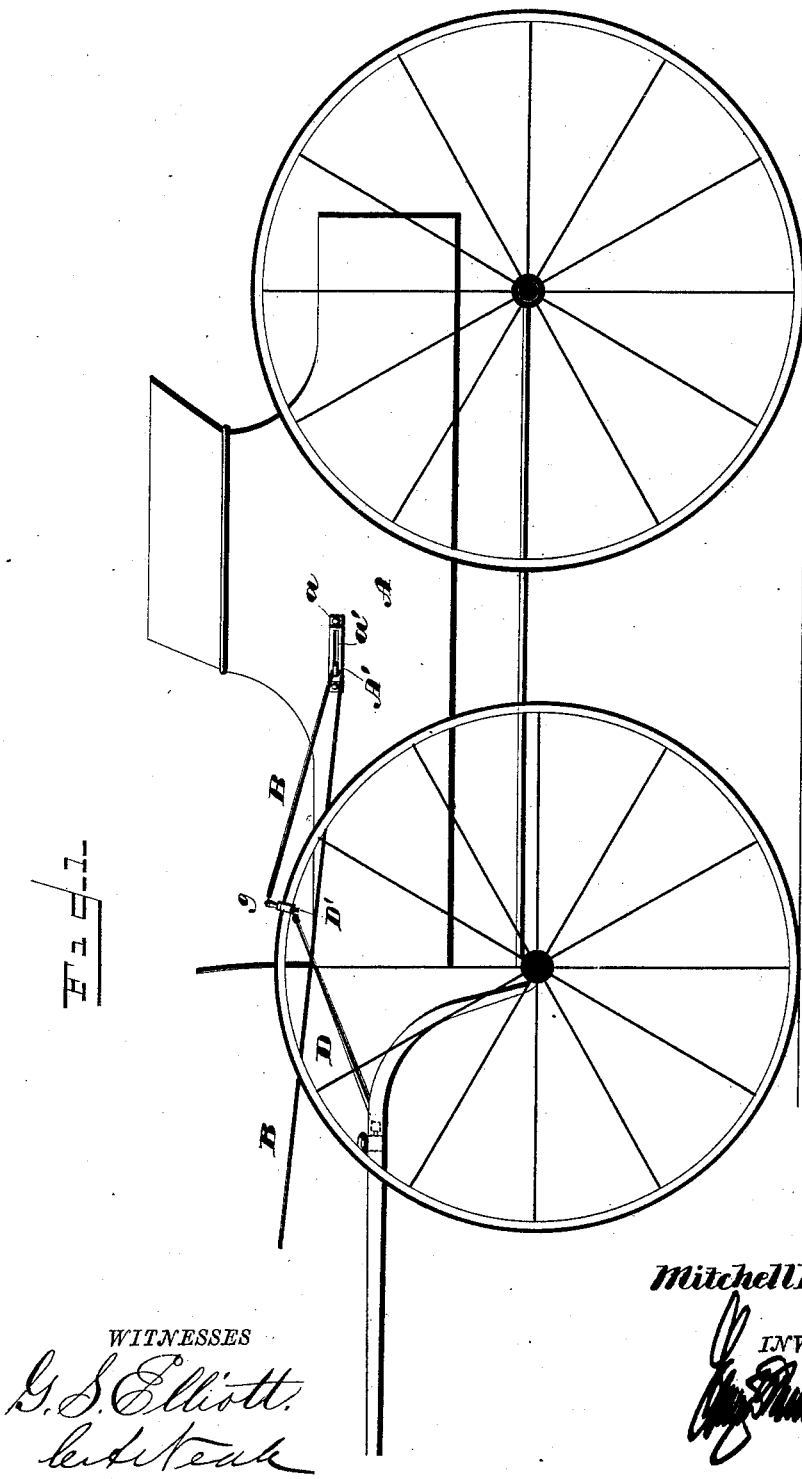
WITNESSES
Mitchell R Heatherly.
INVENTOR
Attorney (No Model.)  3 Sheets—Sheet 2.
M. R. HEATHERLY.
REIN HOLDER.
No. 357,991.  Patented Feb. 15, 1887.
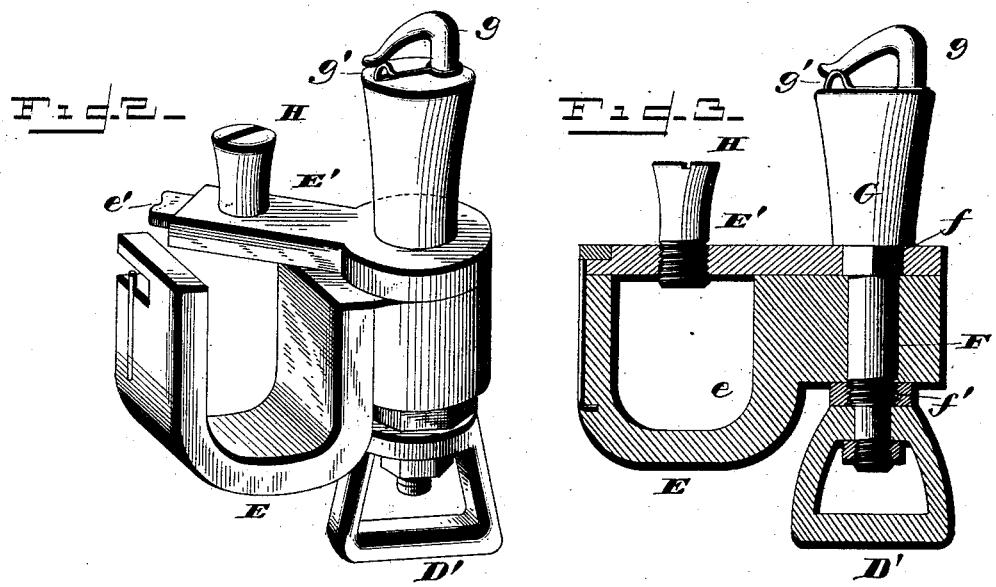
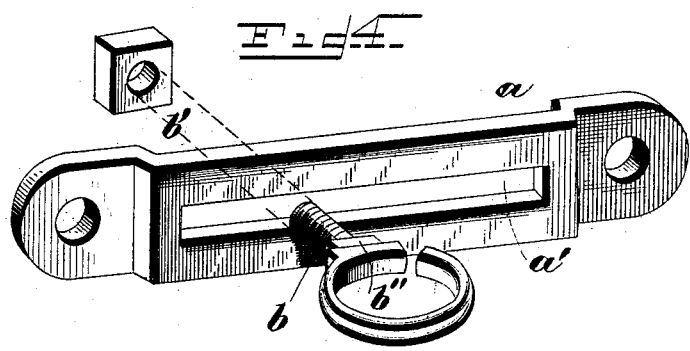
WITNESSES
G. S. Elliott
Mitchell R Heatherly
INVENTOR
Attorney

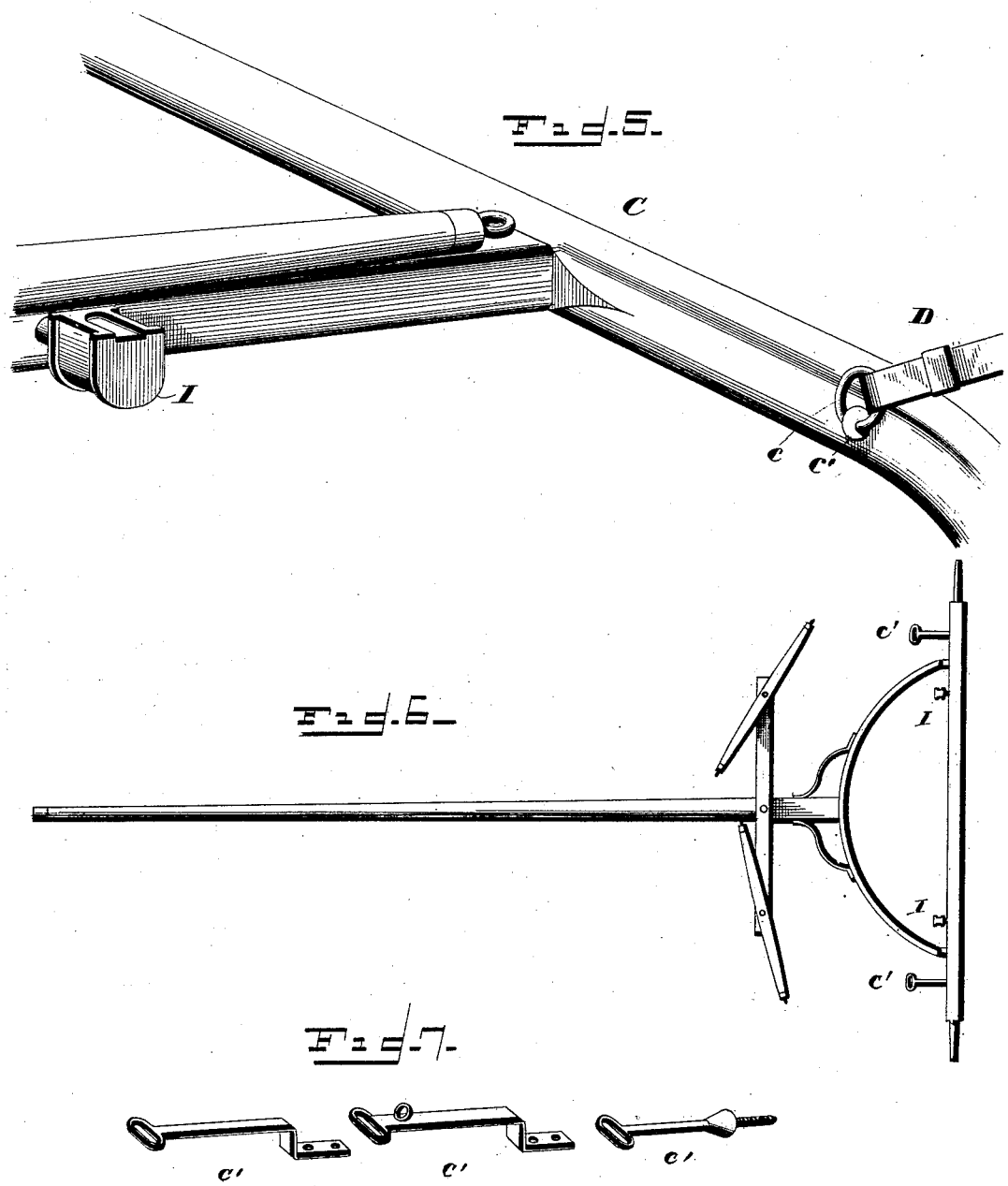

UNITED STATES PATENT OFFICE.

MITCHELL R. HEATHERLY, OF GREEN RIVER, NORTH CAROLINA, ASSIGNOR OF ONE-HALF TO NATHAN McMINN, OF SAME PLACE.

REIN-HOLDER.

SPECIFICATION forming part of Letters Patent No. 357,991, dated February 15, 1887.

Application filed November 30, 1886. Serial No. 220,314. (No model.)

*To all whom it may concern:*

Be it known that I, MITCHELL R. HEATHERLY, a citizen of the United States of America, residing at Green River, in the county of Henderson and State of North Carolina, have invented certain new and useful Improvements in Attachments for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for hitching horses, the object of my invention being to provide an attachment which can be readily attached and detached from a vehicle, so as to serve as a lock for the front wheels of the vehicle, so as to prevent the same from being backed, and also to provide a means whereby, when the vehicle is moved forward, a draft will be applied upon the reins, which will have a tendency to check or stop the horse; and with these ends in view my invention consists in the construction and combination of the parts and attachments, as will be hereinafter fully set forth.

In the accompanying drawings, which illustrate my invention, Figure 1 is a side view of a vehicle, showing my improvements applied thereto. Fig. 2 is a detail perspective view of the attachment, which is attached to the tire of the front wheel of the vehicle when the device is in use. Fig. 3 is a sectional view of Fig. 2. Fig. 4 is a detail perspective view of a sliding block to which the ring through which the rein passes is attached. Fig. 5 is a perspective view of the rear portion of the thills or shafts, showing one manner of applying the strap thereto, and the block for holding the attachments shown in Figs. 2 and 3 upon the shafts when not in use. Fig. 6 is a plan view showing the device applied to the front axle when a pole is employed instead of shafts, and Fig. 7 are detail perspective views showing bars attached to the axle for securing the anti-backing straps thereto.

In the accompanying drawings, A refers to the body of a vehicle, which is provided on each side with a slotted casting, a, which is attached to said body at a slight distance in rear of the front wheel. This casting a is provided centrally with a horizontal slot, a', said slotted portion being raised above the perforated ends to which it is secured to the wagon-body, and through said slot passes an open ring, A', having a screw-threaded bolt, b, formed thereon, which is adapted to engage with a nut, b', which lies under the outwardly-projecting portion of the casting. The upper portion of the bolt adjacent to the ring is provided with a shoulder, b'', which will prevent the same turning in the slot. These slotted castings are attached on each side of the body of the vehicle, and through the open ring A' the ends of the driving-reins B are passed.

The thills or shafts C are of ordinary construction, and in rear of the cross-bar thereof there are attached on each side rings, c, which may be attached to the shafts by eyebolts c', and through these rings c are passed the anti-backing straps D, said straps being provided with suitable buckles for properly adjusting the length thereof. These anti-backing straps D, after being looped through the ring c, extend upwardly, so as to engage the loop D' of the attachment, which is adapted to be secured to the tires of the front wheels. These attachments, as shown in Figs. 2 and 3 of the accompanying drawings, consist of a casting, E, which is provided with a recess, e, which is of the approximate configuration of the tire and felly of the wheel in cross-section. The inwardly-projecting portion of this casting is provided with a perforation, through which passes the shank of the bolt F, said bolt, immediately above the recess or perforation, having a squared portion, f, which lies in a rectangular recess in the covering or locking plate E'.

The lower portion of the shank of the bolt F has a screw-threaded portion, f', with which a suitable nut engages, and immediately beneath the same is located a cylindrical portion, over which the upper end of the loop D' lies, said loop being held in place by a nut which engages with the lower screw-threaded portion of the bolt. The upper portion of the bolt is enlarged, as shown, so as to provide a convenient hand grasping portion, G, which is provided with a flat top, to which is secured a hook, g, which is embraced by a spring, g', which is adapted to close the opening at the end of said hook.

The outer end of the pivoted covering or locking plate is provided with a reduced end, e', having a notch, as shown, said reduced portion being adapted to lie within the open-ended slot in the casting E, a spring being attached adjacent thereto, which will retain the covering-plate in position. This covering-plate is provided immediately above the portion which contacts with the tire of the wheel with a set-screw, H, which will serve as a handle for said pivoted covering-plate, and also as a means for clamping the attachment upon a block attached to the cross-bar of the thills when the same is not in use.

I refers to suitable blocks, which are preferably attached to the rear side of the cross-bar of the thills, said blocks having screw-threaded shanks for securing them thereto, as well as flanged edges, and when the device is not in use the device shown in Figs. 2 and 3 may be attached thereto, so as to be guarded thereby.

When a pole is employed instead of shafts, the attachment I may be secured to the axle of the vehicle and the rings c dispensed with, and slotted bars, as shown in Fig. 7, employed instead of the rings.

In Fig. 7 I have shown three styles of bars which may be employed.

In applying my improved attachment the driving-reins are preferably provided at their ends with rings which are adapted to engage with the hooks g after said driving-reins are passed through the rings A'; and when the parts are attached, as shown in the drawings, should the horse attached to the vehicle move forward, the reins will be tightened upon the bit, so as to act as a check upon him; and should the horse attempt to back, the strap D, which is attached to the shafts or axle and connected with the loops D', will lock the wheels.

With my improved device, should the horse turn to one side, the opposite rein will be drawn upon, and will serve to cause the horse to change his position. As long as a horse attached to a vehicle remains quiet and the vehicle does not move, there will be no pressure brought to bear upon the reins, nor will the wheels be locked; but should the horse move either backward or forward the parts will be brought into operation.

By providing the hook g with a spring-catch, as shown, should the horse back sufficiently to break the straps G, the reins will be released from the hooks as soon as the wheels turn sufficiently to draw vertically upon the ends of the reins; otherwise the hooks will hold the ends of the reins securely attached thereto until released by hand.

It will be evident that by simply turning the portion G of the bolt the covering-plate will be released or swung to one side of the casting E, so that the same can be readily attached and detached from the felly and tire.

I claim—

1. In combination with the anti-backing straps D and driving-reins B, an attachment adapted to be secured and detached from the felly of the wheel, and provided with loops or hooks for attaching the free ends of the anti-backing straps and reins thereto, substantially as shown, and for the purpose set forth.

2. In combination with the driving-reins B, a casting attached to the body of the vehicle in rear of the front wheel of said vehicle, and provided with a ring through which the driving-rein passes, an attachment having a recess adapted to be secured to the rim of the wheel, and provided above said rim with a hoop to which the free end of the driving-rein is attached, substantially as shown, and for the purpose set forth.

3. The attachment for vehicles herein described, consisting of a casting having a recess, a pivoted locking-plate, and a bolt adapted to turn with said locking-plate, said bolt being provided at its upper end with a hook, substantially as shown, and for the purpose set forth.

4. In an attachment for vehicles for the purpose set forth, a casting provided with a U-shaped recess, a locking-plate adapted to be moved over said recess, so as to secure the attachment to the rim of a wheel, a bolt provided with an operating-handle, G, said operating-handle having a hook, g, and a spring, g', at one end, and at the opposite end a swivel-loop, D', the parts being organized substantially as shown, and for the purpose set forth.

5. A holder for the attachment hereinbefore described, when not in use as a rein-holder, consisting of a block, I, over which the rein-holding attachment is adapted to be secured, substantially as shown, and for the purpose set forth.

6. In a hitching device for vehicles, the combination of the slotted casting a a, attached to the body of the vehicle, an open ring adapted to be adjusted longitudinally therein, an attachment constructed substantially as described and adapted to be secured to the rim of the wheel, said attachment having a hook, g, to which the free end of the rein is attached, and an anti-backing strap, D, secured to the thill and to a swivel on the under side of the attachment, the nut of the backing-strap being provided with a buckle for adjusting the same, the parts being organized substantially as shown, and for the purpose set forth.

In testimony whereof I affix my signature in presence of two witnesses.

MITCHELL R. HEATHERLY.

Witnesses:
R. L. HEATHERLY,
S. J. HEATHERLY.